United States Patent [19]
Do et al.

[11] Patent Number: 6,052,276
[45] Date of Patent: Apr. 18, 2000

[54] PASSIVE BACKPLANE COMPUTER

[75] Inventors: Cuong D. Do, Woodland Hills; Joe Butryn; Nhut Trung Ha, both of Los Angeles; Harold C. Kameya, Granada Hills, all of Calif.

[73] Assignee: Citicorp Development Center, Inc., Los Angeles, Calif.

[21] Appl. No.: 08/957,927

[22] Filed: Oct. 27, 1997

Related U.S. Application Data

[60] Provisional application No. 60/035,381, Jan. 13, 1997.

[51] Int. Cl.[7] ............................................ G06F 1/16
[52] U.S. Cl. .......................... 361/684; 361/687; 361/788; 361/803
[58] Field of Search .................................... 361/683, 684, 361/686, 687, 788, 803, 785; 395/280, 281, 282, 284

[56] References Cited

U.S. PATENT DOCUMENTS

| | | | |
|---|---|---|---|
| 5,060,111 | 10/1991 | Takashima | 361/684 |
| 5,089,969 | 2/1992 | Bradshaw et al. | 73/460 |
| 5,227,957 | 7/1993 | Deters | 361/395 |
| 5,305,183 | 4/1994 | Teynor | 361/686 |
| 5,406,453 | 4/1995 | Cusato et al. | 361/683 |
| 5,440,755 | 8/1995 | Harwer et al. | 395/281 |
| 5,519,573 | 5/1996 | Cobb et al. | 361/686 |
| 5,701,231 | 12/1997 | Do et al. | 361/683 |
| 5,761,033 | 6/1998 | Wilhelm | 361/686 |
| 5,788,509 | 8/1998 | Byers et al. | 361/788 |
| 5,822,551 | 10/1998 | Crane, Jr. et al. | 395/284 |
| 5,838,929 | 11/1998 | Tanikawa | 395/282 |

*Primary Examiner*—Leo P. Picard
*Assistant Examiner*—John D. Reed
*Attorney, Agent, or Firm*—George T. Marcou; Kilpatrick Stockton LLP

[57] ABSTRACT

A computer using a passive backplane internal architecture is provided. In particular, a CPU board is provided that has a plurality of I/O interfaces (e.g., IDE, EIDE, SCSI, wide SCSI, etc.) so as to reduce the need to upgrade the system over time. However, once repair or upgrade is needed, the plug-in board configuration of the computer greatly facilitates such activity, which reduces the need for specialized (and expensive) technicians to maintain the computer. The power supply of the computer is preferably provided on an additional board within the computer. This improves the airflow of cooling air in the computer, thereby enhancing system reliability.

29 Claims, 4 Drawing Sheets

PASSIVE BACKPLANE COMPUTER

This application claims benefit of provisional application Ser. No. 60/035,381 filed Jan. 13, 1997.

FIELD OF THE INVENTION

The present invention relates to computer systems having an internal architecture based on a passive backplane that receives one or more plug-in computer boards, particularly a CPU board that incorporates the various elements typically provided on a conventional motherboard. The present invention is particularly applicable to a computer for automatic, unattended process control, such as in an automatic bank teller terminal.

BACKGROUND OF THE INVENTION

The internal architecture of home personal computers (PC's) is virtually always based on a motherboard arrangement on which a CPU, memory module sockets, and various input/output (I/O) connectors are provided. The motherboard may be provided with a one or more expansion slots by which additional device boards can be connected to the computer, such as, for example, a sound board, a graphics board, etc.

The motherboard in a conventional PC is provided within a housing or cabinet that also typically includes a power supply and a cooling fan for cooling the interior of the housing.

In terms of its computing power and relatively compact overall size, the home PC is theoretically attractive for certain business applications, such unattended control of automatic bank teller machines (ATM's).

However, the motherboard-based PC architecture has several deficiencies that makes it unsuitable for reliable use in unattended applications.

First, the components in home PC's are relatively low quality and prone to failure. For example, the power supply in a home PC tends to have a high failure rate, usually because the overall system architecture does not provide sufficient cooling for the power supply. In part, the arrangement of components in a home PC tends to impede cooling air flow from the cooling fan. Therefore, the cooling process becomes less effective, and temperature sensitive components become prone to heat-related failure.

Indeed, home PC manufacturers are typically motivated to use relatively lower end components in order to maximize their profit margins. In some systems, the total cost of components might be several tens of dollars, while the system is sold to the consumer for several thousands of dollars. Moreover, home PC manufacturers frequently expect consumers to simply "buy up" to a new model when their current computer begins to fail. The monetary cost and inconvenience of repairing a home computer is at least perceived to be much more burdensome than simply buying a newer computer. Thus, home PC manufacturers are not terribly motivated to use unusually reliable components.

Consumers are also likely to buy up rather than spend time, money, and effort to upgrade an older computer. In particular, the motherboard arrangement of PC's are generally difficult to upgrade, requiring particular jumper settings, manipulation of parts within the restricted confines of the cabinet, and various system configuration setups that can be difficult to perform properly. In addition, vital parts of the computer system are provided on motherboard such that upgrading certain characteristics of the computer (e.g., upgrading the CPU beyond the range of clock speeds that the motherboard is physically designed to handle) requires replacing the entire motherboard. It can be appreciated that this effectively means completely replacing the entire computer.

Another factor that makes home PC's unsuitable for extended use in commercial applications is the relatively rapid turnover of system designs in the home PC market. A given home PC design is rarely produced for more than a year or so. Thus, the issue of spare parts and the like becomes difficult or impossible to resolve, since that given system will soon no longer be manufactured.

These factors make home PC's unsuitable for extended commercial use, particularly in an application where the computer is left unattended, for example, in an ATM.

A high rate of component failure is unacceptable because this requires frequent and costly and time consuming visits by skilled (and, therefore, expensive) repair technicians to various ATM sites. Once such failures occur, repair is made difficult due the motherboard configuration, because factors such as physical jumper settings and system configurations must be checked. Upgrading a conventional computer in an ATM is also troublesome because, again, an experienced technician must visit each ATM site. In a major metropolitan area, the number of sites that must be visited might well run into at least the hundreds, if not thousands. Moreover, once repair is required, it is certainly preferable to have a ready and reliable source of spare parts and the like in order to efficiently complete repairs. The above-mentioned fast turnover of home PC designs virtually mandates regular upgrades, even if only to maintain the ability to readily repair machines. Yet, this again raises the issue of the cost and inconvenience of sending experienced technicians to numerous sites.

In order to address the issue of system reliability, a computer system sometimes known as an Industrial Personal Computer (IPC) is conventionally available. IPC's are characteristically constructed for "heavy-duty" applications, and have increased tolerance for ambient operating temperature, humidity, shock loads, vibration loads, and particulate contaminants in the ambient atmosphere. Unfortunately, this increased operational performance is associated with a very high cost for system components, compared to home PC type systems. The sheer cost of the IPC's are economically prohibitive for certain commercial applications, such as ATM control, in view of the numbers of computer units required. In any event, in terms of protecting the investment in such a relatively expensive system, the IPC also requires service by an experienced technician in order to ensure that repairs and service are properly performed. Moreover, the internal architecture of IPC's are frequently based on the motherboard design. Therefore, the IPC suffers from the same problems as the home PC in terms of serviceability and upgradeability.

SUMMARY OF THE INVENTION

In view of the above-described problems with conventional computer system architectures, it can be appreciated that a reliable computer system is needed that can be easily serviced and/or upgraded. The design of the computer system also needs to be usable over long periods of time so as to reduce the need for frequent upgrading and to maintain the availability of spare parts and the like.

In order to address these issues, the present invention provides a computer based on a passive backplane design, in which all of the various components of the computer, including the CPU, are provided on plug-in circuit boards. These plug-in boards are received by a passive backplane provided in the computer housing and are preferably self-configurable by using automatic system recognition technology similar to, for example, Plug-and-Play technology. This arrangement greatly facilitates repair and upgrade of the computer system, since all components can simply be unplugged and replaced by a different board. In particular, a CPU plug-in board is provided that includes the components conventionally provided on a motherboard, such as a CPU mounted in a CPU socket, RAM modules mounted in memory module sockets, I/O interfaces, serial and parallel ports, etc.

It is a particular feature of the present invention to provide a CPU plug-in board that includes a plurality of data interface types (e.g., IDE, EIDE, PCMCIA, SCSI, wide SCSI, SCSI -2, SCSI-3, ultra SCSI, ultra-wide SCSI, parallel ports, serial ports, etc.), so that the need for hardware upgrades or add-ons is further reduced. A port may also be provided for connecting the computer to a user-operated input device, such as a keyboard, a keypad, a touchscreen, or the like. Finally, a conventional on-board speaker may be provided on the CPU plug-in board if appropriate.

It is also a characteristic of the present invention to provide a very compact system that can still receive the largest plug-in boards contemplated by current standards (e.g., IEEE standards).

BRIEF DESCRIPTION OF THE DRAWINGS

The present invention is described hereinbelow with reference to the drawings appended hereto, in which.

DETAILED DESCRIPTION OF THE PREFERRED EMBODIMENT

Figure 1:
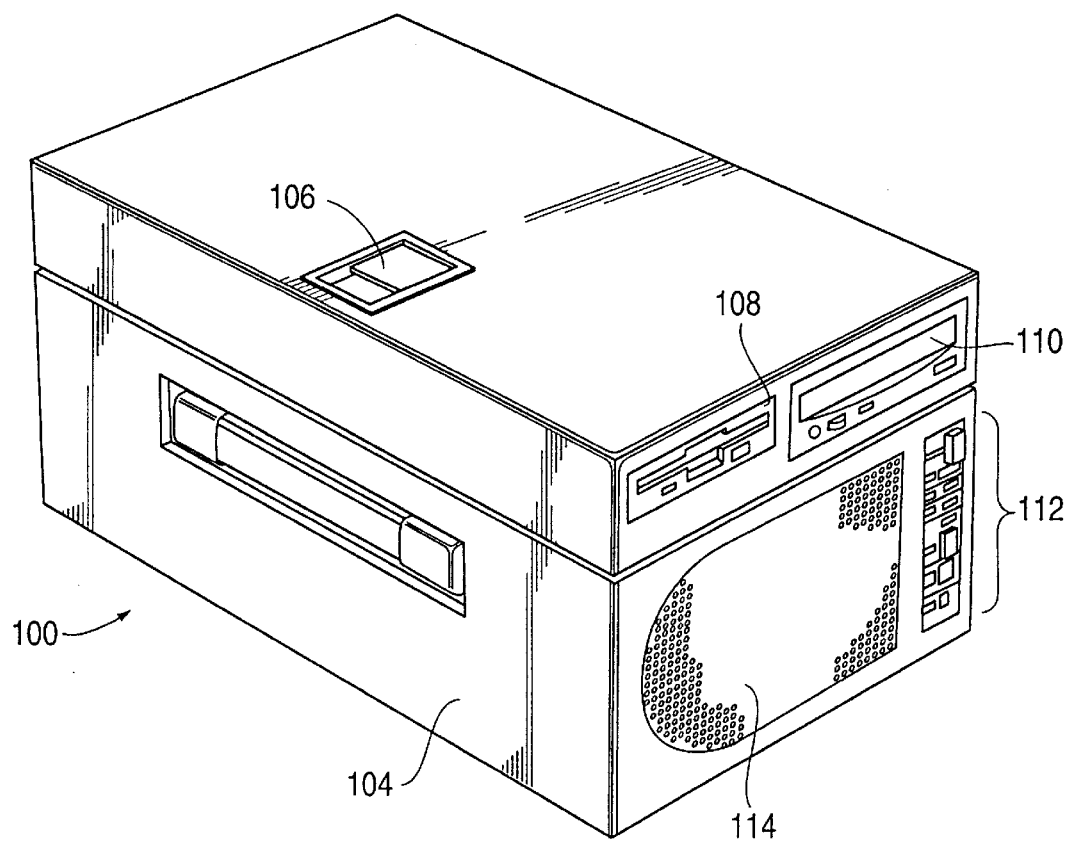
FIG. 1 is a perspective view of the exterior of the computer according to present invention.

FIG. 1 is a perspective view of computer 100 according to the present invention. In this arrangement, the housing of computer 100 is provided in two parts 102 and 104 that are hinged together (on the side of computer 100 opposite the reader in this view). The parts of the housing may be latched shut, for example, by a spring-loaded lever 106, as seen in FIG. 1. Depending on the application in which the computer is used, the housing may include a conventional locking mechanism (not illustrated here) to prevent unauthorized opening of housing.

Computer 100 may be provided with a variety of peripheral devices, such as, for example, a standard 3.5" floppy drive 108 and a standard CD-ROM drive 110.

Computer 100 may also be provided with a control panel 112 that has a power on-off switch, a push-to-test switch, a reset switch, etc., as is generally known in the art.

Computer 100 also includes at least one air intake 114 by which air is exchanged between the interior and exterior of computer 100 to provide cooling.

On one side of computer 100 (opposite the reader in this view) access to the internal components of the computer (e.g., serial and parallel ports) is provided through slot openings or the like.

Figure 2:
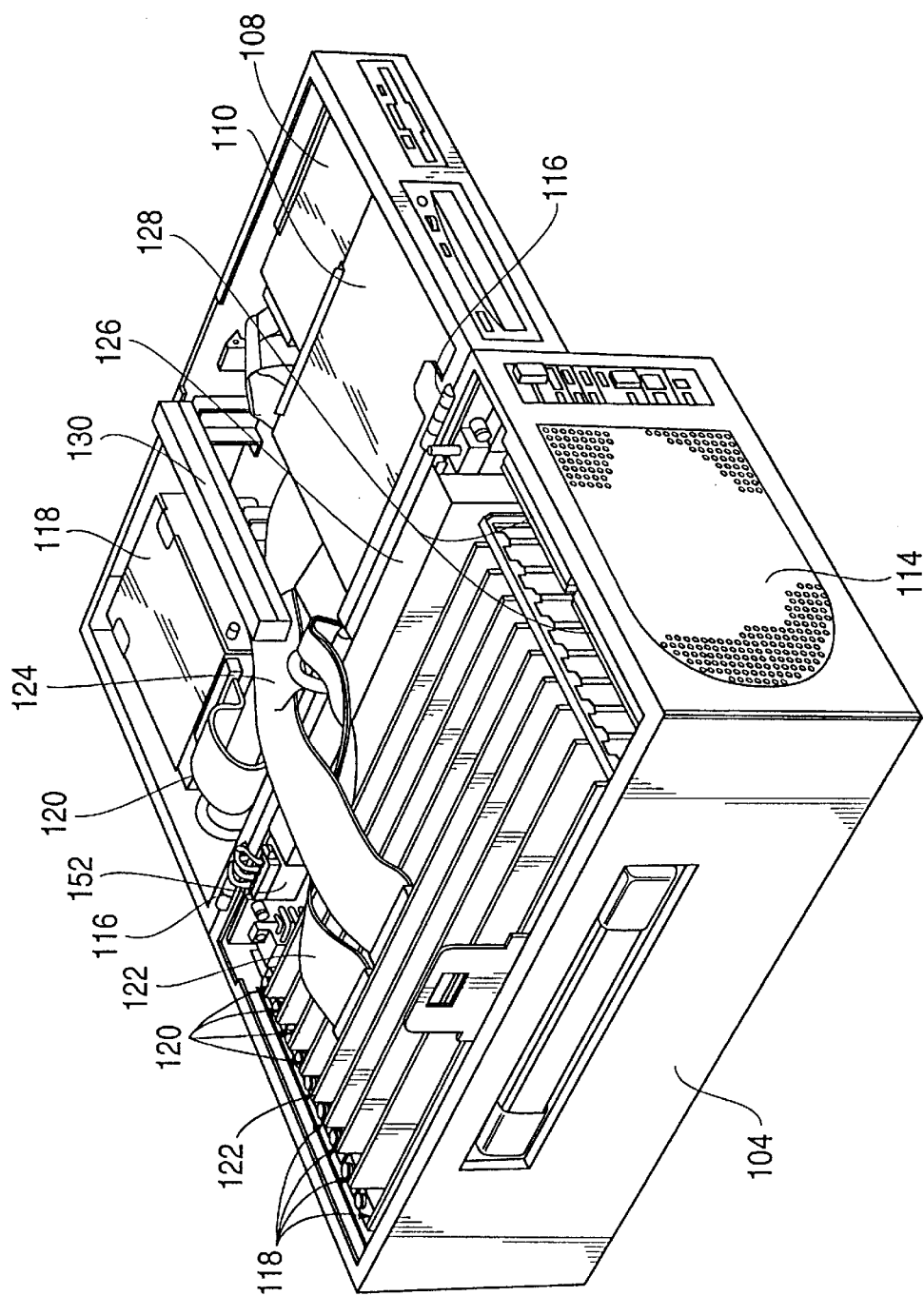
FIG. 2 is a perspective view of the computer shown in FIG. 1 with the access door opened, thereby making the interior visible.

FIG. 2 shows computer 100 with housing part 102 opened relative to housing part 104, by way of, for example, hinges 116.

FIG. 2 illustrates a plurality of plug-in boards arranged within the housing of the computer. In this illustration, four ISA boards 118, four PCI boards 120, and one CPU board 122 are provided by way of example. The number of plug-in boards provided may certainly be varied.

It is noted here that the ISA boards and the PCI boards are typically for conventional expansion features, such as sound and graphics/video. Thus, no specific description of the ISA or PCI boards is provided here, except to note that they are all provided with suitably configured tab connectors along an edge thereof that are received in correspondingly configured ISA and/or PCI slots provided on passive backplane. It is noted furthermore that some plug-in boards, including the CPU board described hereinbelow, are provided with both ISA and PCI tab connectors in order to accommodate the components provided thereon. This can be seen more clearly in FIG. 3.

In another embodiment of the present invention, a plurality of CPU boards may be provided (not seen here) in order to create a server engine.

It is again noted that, aside from the arrangement of parts within the housing of computer 100, the components included therein are generally conventionally known. For example, the computer includes one or more standard hard disk drives 119 (two are included in the example illustrated here). Hard disk drives 119 are connected to the remainder of the computer by standard ribbon cabling 121. Likewise, a standard floppy disk drive 108 is connected by ribbon cable 123, and a standard CD-ROM drive 110 is connected by ribbon cable 124. The ribbon cables use standard multi-pin push-in connectors at either end thereof.

In order to reduce space consumption, the power supply 126 is provided embedded on a board that is mounted in an orientation similar to (i.e., generally parallel with) the plug-in boards. This configuration is advantageous in terms of space-savings over the conventional box-like power supplies that are used in home PC's. In addition, the "flattened" configuration of the power supply 126 (see, for example, FIG. 4) presents an increased surface area over which cooling air flows. This enhances heat dissipation from the power supply and therefore increases the reliability and lifespan of the power supply. The actual structure of power supply is technically conventional, taking into account the characteristic overall shape of the power supply according to the present invention so that it is suitable for mounting on a board as shown.

Computer 100 is provided with at least one (preferably at least two) cooling fan modules 128, suitably mounted relative to air intake 114 so as to enable the exchange of air from the interior of the computer with air from the exterior thereof. Air intake 114 may be provided with an air filter (not illustrated here) in order to filter out any particulate contaminants in the ambient air.

It can be appreciated that the generally parallel orientation of plug-in boards 118, 120, and 122, and power supply 126 relative to cooling fan module(s) 128 create an ideal airflow of cooling air around the plug-in boards, without any unusual projections that significantly block airflow. This enhances cooling of the interior of the computer and, in turn, enhances system reliability by avoiding heat-related failures.

Housing part 102 may be provided with a board retaining member 130 that extends transversely relative to the plug-in boards and the power supply. The retaining member 130 is arranged so as to restrain the plug-in boards and power supply from movement when the housing part 102 is closed relative to housing part 104.

Figure 3:
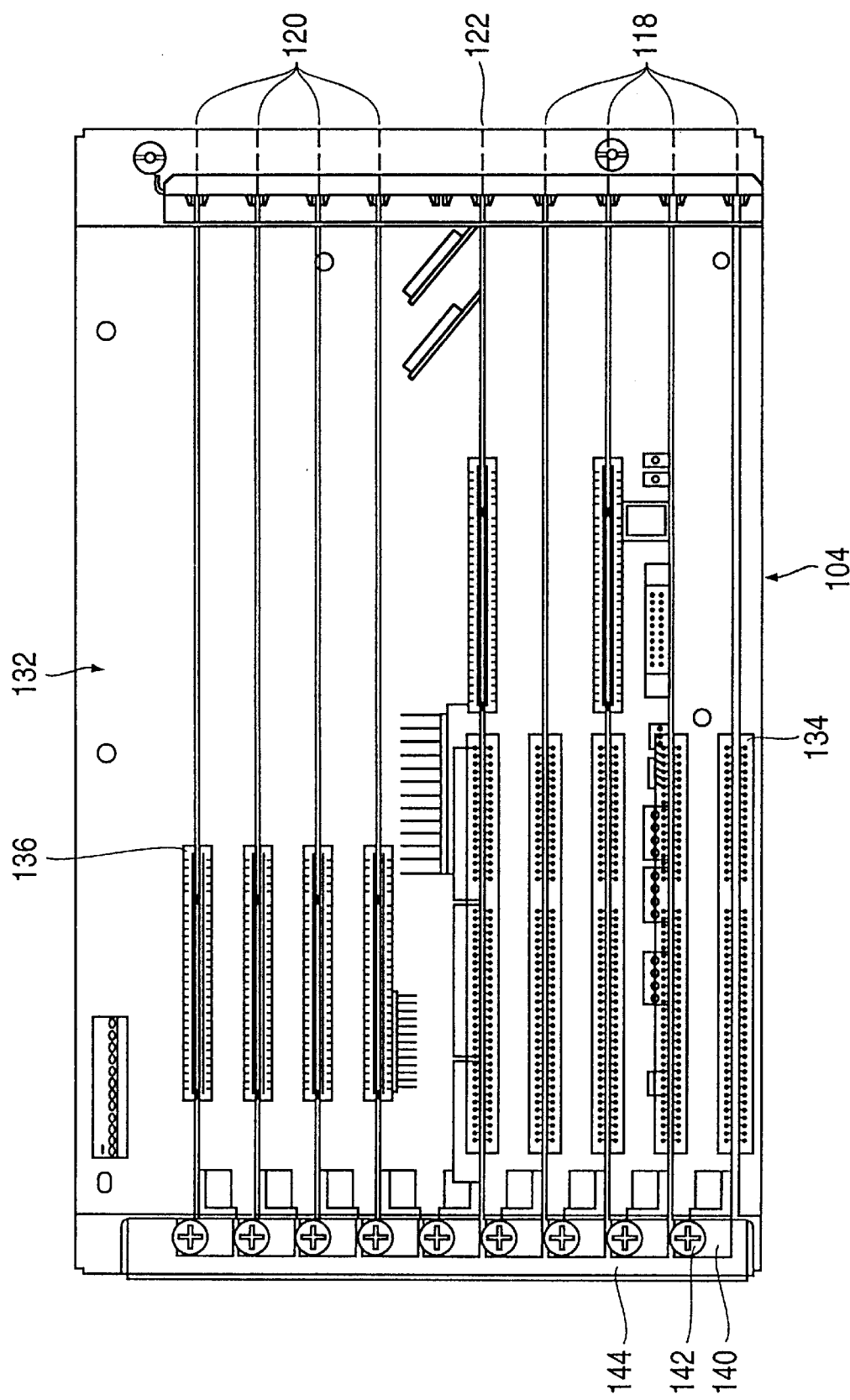
FIG. 3 is a plan view of the interior of the computer shown in FIG. 1, illustrating a plurality of plug-in boards plugged into the passive backplane of the computer.

FIG. 3 is a plan view looking down into the interior bottom of housing part 104 so as illustrate passive backplane 132. As its name implies, the passive backplane 132 is simply a passive circuit board that includes a plurality of electrically interconnected connectors (usually slot connectors) for receiving one or more plug-in boards.

Conventionally, plug-in boards are connected in accordance with a given data bus configuration. Two common configurations are ISA and PCI. Therefore, the slot connectors are typically called ISA or PCI slots (or expansion slots). Other configurations are known, and could be provided here (e.g., EISA, etc.).

As was illustrated in FIG. 2, four ISA boards 118, four PCI boards 120, and a CPU board 122 are provided in the computer 100. ISA boards 118 are provided with conventional tab connectors along an edge thereof that are received in correspondingly configured ISA slots 134.

PCI boards 120 are likewise provided with conventional tab connectors along an edge thereof that are received in correspondingly configured PCI slots 136.

It can be seen from FIG. 3 that one of the ISA boards 118 and the CPU board 122 are mounted in spaces that include both an ISA slot 134 and a PCI slot 136. This is a known arrangement for instances when the elements provided on a plug-in board use both data bus arrangements. It is noted that if the ISA board 118 provided in the space having both ISA and PCI slots only uses an ISA data bus arrangement, then the tab connector for the PCI slot is simply omitted from the board, so that the space for the board operates solely as an ISA slot. (The reverse is also true, such that a "PCI-only" board could be mounted in that same space.) Typically, the CPU board 122 will use both ISA and PCI data bus slots because certain elements are customarily interconnected by an ISA bus while other are interconnected by a PCI bus.

Along one edge of housing part 104, supporting slots 138 are provided to help maintain the plug-in boards in the proper vertical connection orientation. At the opposite edge of housing part 104 from supporting slots 138, a conventional mounting bracket for plug-in boards is provided, wherein each plug-in board is provided with a bracket 140 that is adapted to receive a screw, bolt, or the like 142, by which the plug-in board is secured in position relative to a transversely extending mount 144 provided in the housing part 104.

Figure 4:
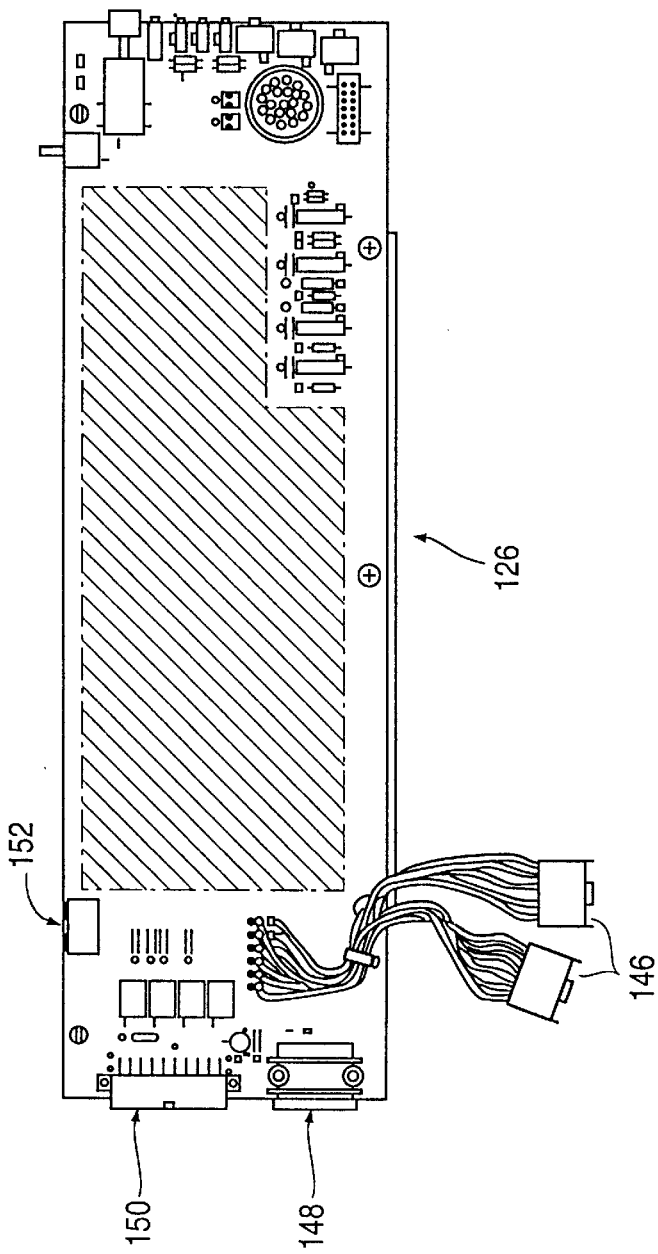
FIG. 4 is plan view of a power supply suitable for use present invention.
Figure 5:
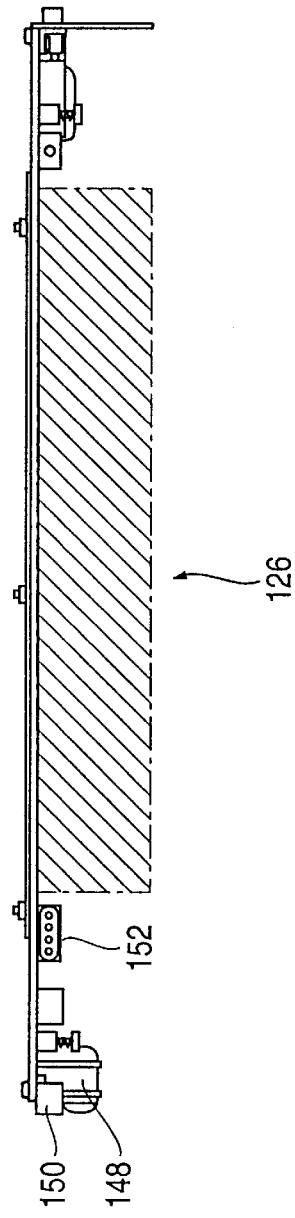
FIG. 5 is an edge view of the power supply shown in FIG. 4.

FIG. 4 illustrates the power supply 126 according to the present invention. As mentioned previously, except for the particular flattened shape and arrangement of the power supply on a board, the power supply is technically conventional. Features similar to those provided with, for example, a home PC power supply are provided, such as power connector plugs 146, an AC power input 148, a DC power output 150, and a peripheral power receptacle 152.

While the present invention has been described with respect to what are believed to be the most practical embodiments thereof, it is particularly noted that this is by way of example only, and appropriate modifications and variations thereof are possible within the spirit and scope of the claims appended hereto.

What is claimed is:

1. A passive backplane computer comprising:
   a housing;
   one or more plug-in circuit boards;
   a passive backplane situated in the housing, said passive backplane comprising a plurality of electrical connectors, said plurality of electrical connectors each being constructed and arranged to be selectively electrically connected to the one or more plug-in circuit board, wherein at least some of said electrical connectors are interconnected with one another;
   at least one cooling fan arranged so as to exchange air from within said housing with air from outside said housing;
   a central processing unit (CPU) plug-in board connected to at least one of said plurality of electrical connectors and including a plurality of electrically interconnected elements thereon, said plurality of elements comprising:
   a CPU; and
   a plurality of input/output (I/O) interfaces, each of the plurality of I/O interfaces implementing a protocol for communicating between the CPU plug-in board and a plug-in circuit board; and
   said CPU plug-in board further includes at least one data bus associated with at least some of said plurality of elements, by which said at least some of said plurality of elements are electrically connected to said passive backplane via said connection with said at least one of said electrical connectors on said passive backplane.

2. A computer as claimed in claim 1, wherein said electrical connectors provided on said passive backplane are electrical slot connectors.

3. A computer as claimed in claim 2, wherein said CPU plug-in board is provided with industry standard architecture (ISA) and peripheral component interconnect (PCI) data buses and respective tab connectors therefor, and said passive backplane is provided with an ISA electrical slot connector and a PCI electrical slot connector that are provided relative to one another on said passive backplane such that said respective tab connectors of said CPU plug-in board can be received thereby.

4. A computer as claimed in claim 2, wherein said plurality of I/O interfaces comprises at least one from the group including: integrated drive electronics (IDE), enhanced integrated drive electronics (EIDE), personal computer memory common interface architecture (PCMCIA), small computer system interface (SCSI), wide SCSI, SCSI-2, SCSI-3, ultra SCSI, and ultra wide SCSI interfaces and at least one parallel port and at least one serial port.

5. A computer as claimed in claim 4, wherein said CPU plug-in board further includes a memory cache electrically connected to said at least one data bus.

6. A computer as claimed in claim 4, wherein said CPU plug-in board further includes at least one memory module electrically connected to said at least one data bus.

7. A computer as claimed in claim 4, wherein said CPU plug-in board further includes a port for connection with a user-operated input device.

8. A computer as claimed in claim 4, further comprising at least one floppy disk drive electrically connected to one of said I/O interfaces provided on said CPU plug-in board.

9. A computer as claimed in claim 4, further comprising at least one hard disk drive electrically connected to one of said I/O interfaces provided on said CPU plug-in board.

10. A computer as claimed in claim 4, further comprising at least one compact disc read-only memory (CD-ROM)

drive electrically connected to one of said I/O interfaces provided on said CPU plug-in board.

11. A computer as claimed in claim 4, further comprising a power supply mounted on a board, wherein said power supply board and said CPU plug-in board are arranged in said housing in a generally parallel orientation, said power supply being electrically connected to said passive backplane.

12. A computer as claimed in claim 8, further comprising a power supply mounted on a board, wherein said power supply board and said CPU plug-in board are arranged in said housing in a generally parallel orientation, said power supply being electrically connected to said at least one floppy disk drive.

13. A computer as claimed in claim 9, further comprising a power supply mounted on a board, wherein said power supply board and said CPU plug-in board are arranged in said housing in a generally parallel orientation, said power supply being electrically connected to said at least one hard disk drive.

14. A computer as claimed in claim 10, further comprising a power supply mounted on a board, wherein said power supply board and said CPU plug-in board are arranged in said housing in a generally parallel orientation, said power supply being electrically connected to said at least one CD-ROM drive.

15. A computer as claimed in claim 11, wherein said power supply board includes an AC power input receptacle, a DC power output receptacle, at least one power connector plug, and a peripheral power receptacle.

16. A computer as claimed in claim 12, wherein said power supply board includes a power connector plug electrically connected to said at least one floppy disk drive.

17. A computer as claimed in claim 13, wherein said power supply board includes a power connector plug electrically connected to said at least one hard disk drive.

18. A computer as claimed in claim 14, wherein said power supply board includes a power connector plug electrically connected to said at least one CD-ROM drive.

19. A computer as claimed in claim 4, further comprising a plug-in audio board having sound generating hardware provided thereon, said plug-in audio board being connected to at least one of said plurality of electrical connectors provided on said passive backplane.

20. A computer as claimed in claim 4, further comprising a plug-in graphics board having graphics hardware provided thereon, said plug-in graphics board being connected to at least one of said plurality of electrical connectors provided on said passive backplane.

21. A computer as claimed in claim 19, wherein said CPU plug-in board and said plug-in audio board are oriented so as to be generally parallel to one another.

22. A computer as claimed in claim 20, wherein said CPU plug-in board and said plug-in graphics board are oriented so as to be generally parallel to one another.

23. A plug-in circuit board for a computer having a passive backplane, said circuit board including thereon:
    a socket for receiving and retaining a central processing unit therein;
    at least one socket for receiving and retaining a memory module therein;
    a plurality of input/output interfaces comprising one or more from the group including: integrated drive electronics (IDE), enhanced integrated drive electronics (EIDE), personal computer memory common interface architecture (PCMCIA), small computer system interface (SCSI), wide SCSI, SCSI-2, SCSI-3, ultra SCSI, and ultra wide SCSI interfaces;
    at least one data bus for interconnecting elements provided on the circuit board;
    at least one tab connector for connecting the circuit board with a passive backplane, said at least one tab connector being associated with said at least one data bus and being provided on an edge of the circuit board.

24. A plug-in circuit board as claimed in claim 23, wherein said at least one data bus is an industry standard architecture (ISA) data bus and said at least one tab connector is adapted to be received in an ISA electrical slot connector.

25. A plug-in circuit board as claimed in claim 23, wherein said at least one data bus is a peripheral component interconnect (PCI) data bus and said at least one tab connector is adapted to be received in a PCI electrical slot connector.

26. A plug-in circuit board as claimed in claim 23, wherein an industry standard architecture (ISA) data bus and a peripheral component interconnect (PCI) data bus are provided on the circuit board, wherein the circuit board includes a tab connector adapted to be received in an ISA electrical slot connector and a tab connector adapted to be received in a PCI slot connector.

27. A plug-in circuit board as claimed in claim 23, further including thereon a memory cache.

28. A plug-in circuit board as claimed in claim 23, further including thereon an on-board speaker.

29. A plug-in circuit board as claimed in claim 23, further including thereon a keyboard interface.

* * * * *